(No Model.) 6 Sheets—Sheet 1.
A. D. TYRREL & J. B. AUFULDISH.
CASH REGISTER AND INDICATOR.
No. 511,257. Patented Dec. 19, 1893.
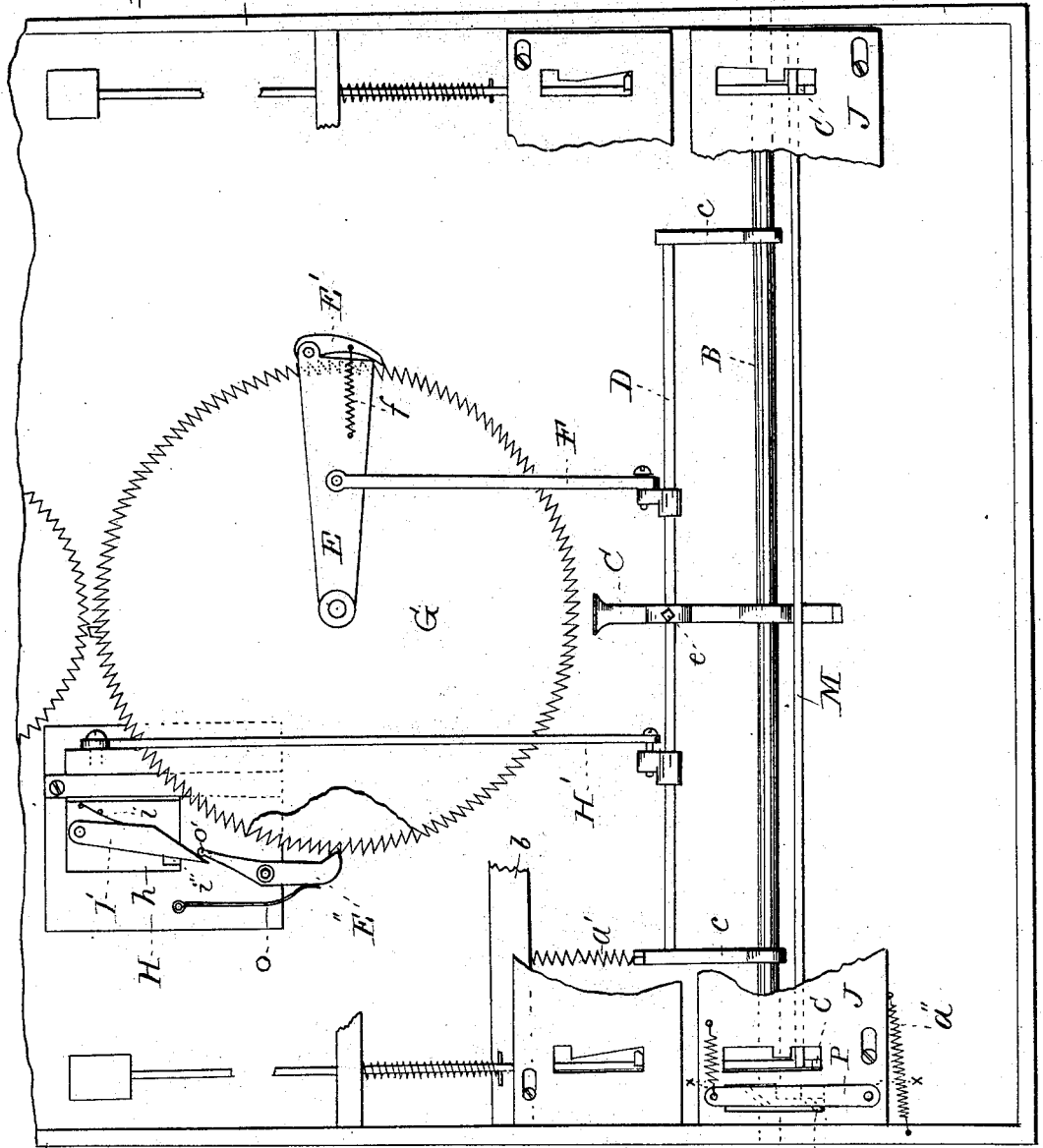
WITNESSES:
R. J. McCarty.
Ewing French.
INVENTORS:
Alvin D. Tyrrel
John B. Aufuldish
BY Toulmin & Toulmin
ATTORNEYS
THE NATIONAL LITHOGRAPHING COMPANY,
WASHINGTON, D. C.

(No Model.) 6 Sheets—Sheet 2.
A. D. TYRREL & J. B. AUFULDISH.
CASH REGISTER AND INDICATOR.
No. 511,257. Patented Dec. 19, 1893.
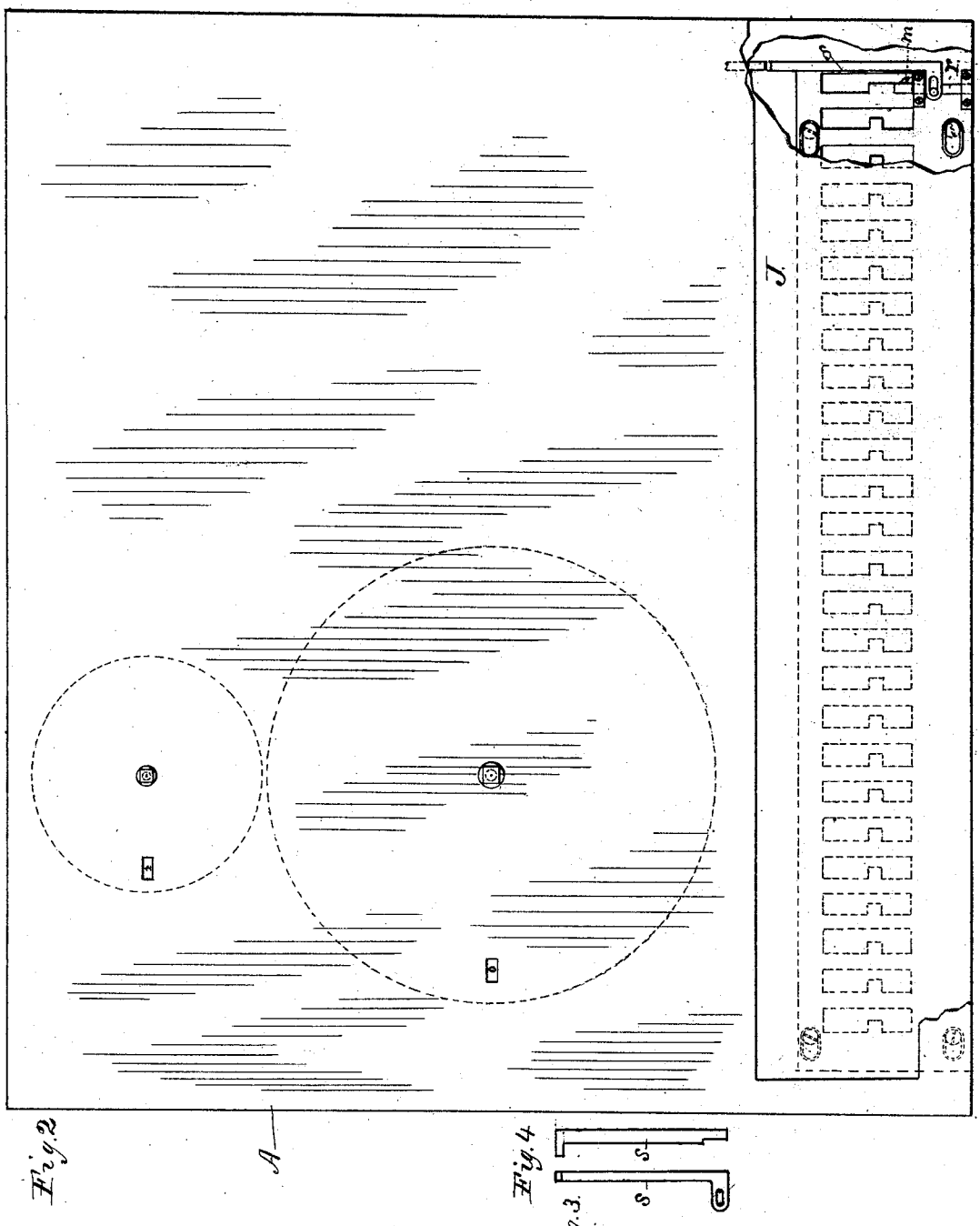
WITNESSES:
R. J. McCarty
Ewing French
INVENTORS:
Alvin D. Tyrrel
John B. Aufuldish
BY Toulmin & Toulmin
ATTORNEYS.

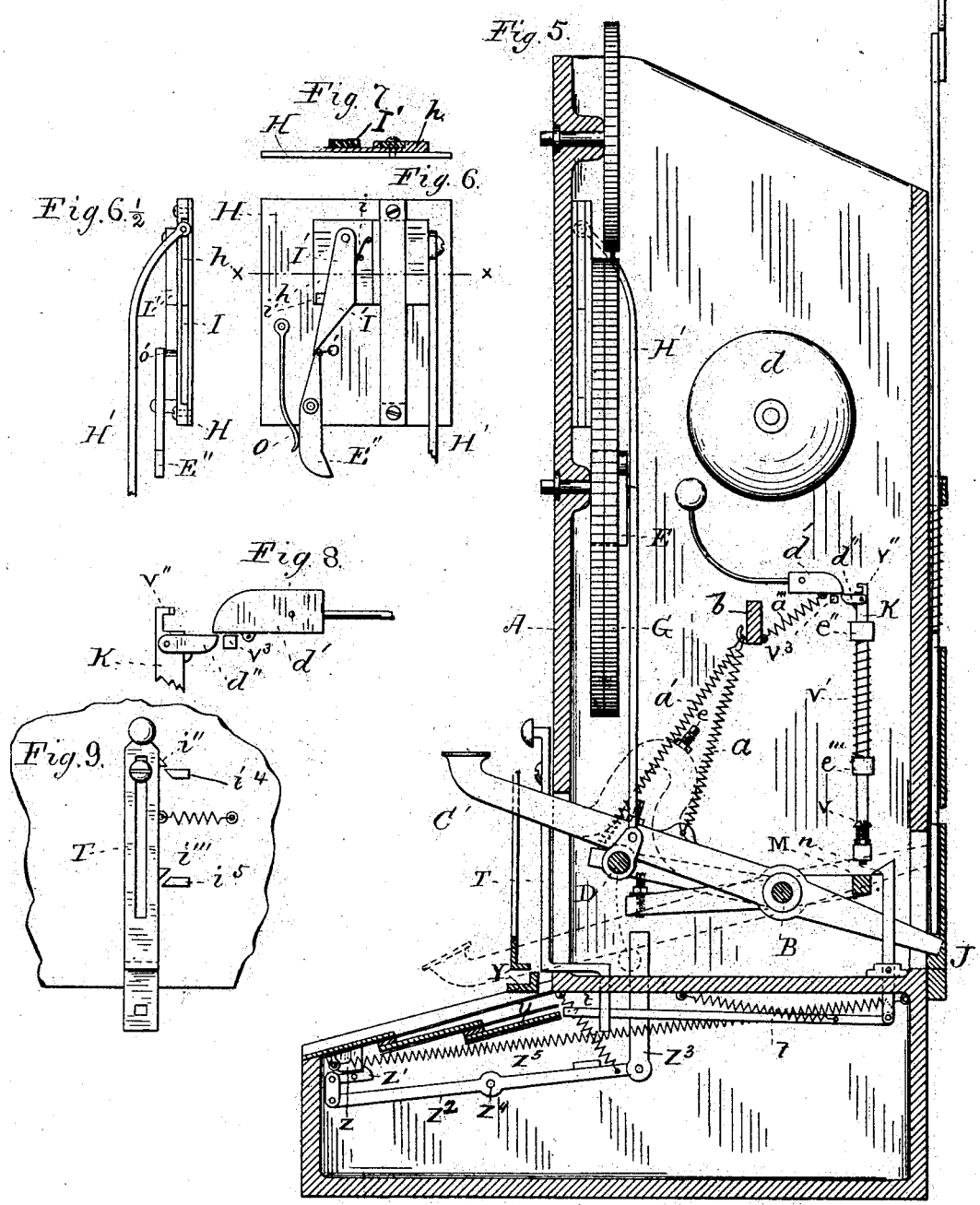

(No Model.) 6 Sheets—Sheet 4.
A. D. TYRREL & J. B. AUFULDISH.
CASH REGISTER AND INDICATOR.
No. 511,257. Patented Dec. 19, 1893.
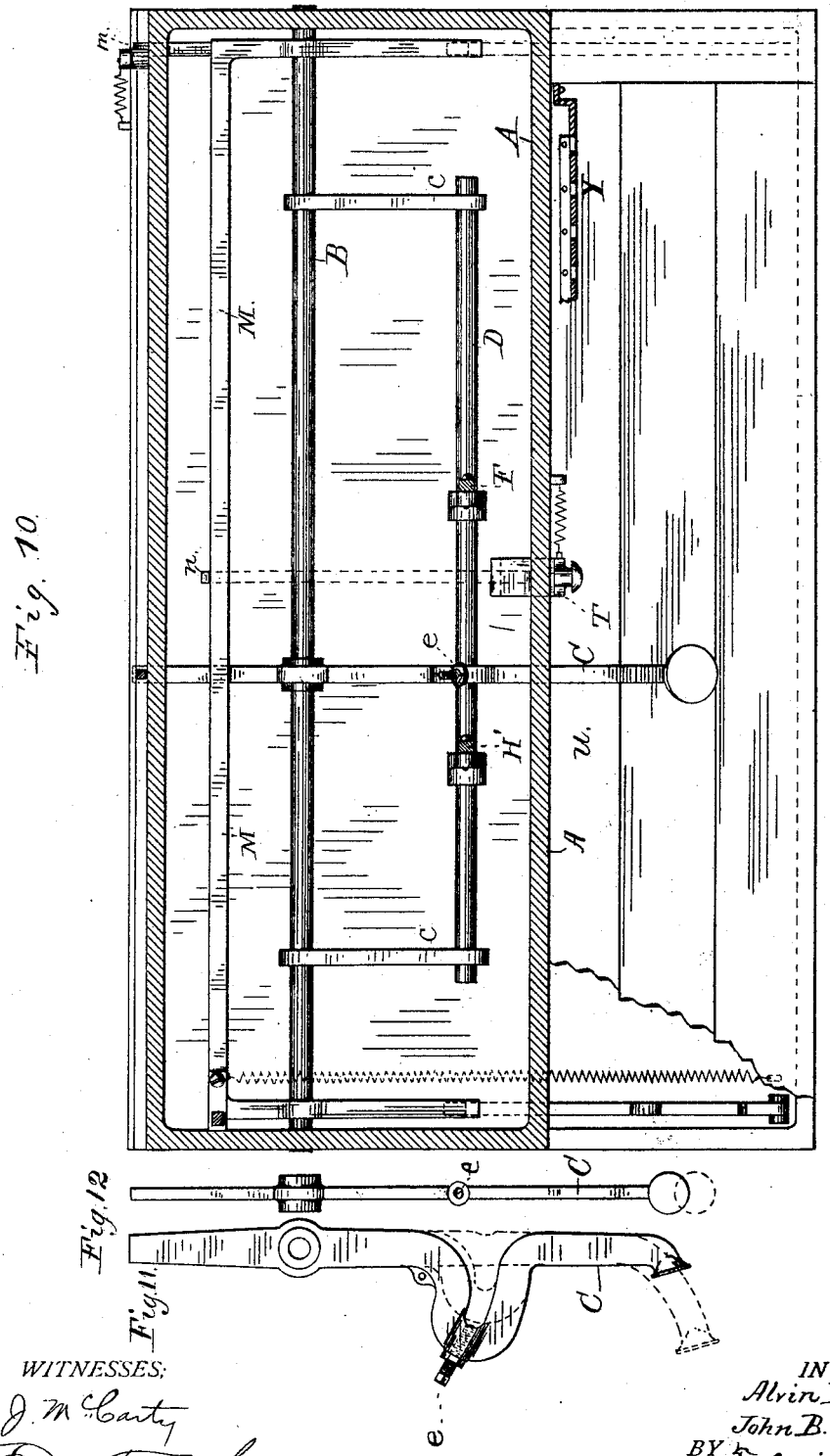
WITNESSES:
R. J. McCarty
Ewing French
INVENTORS:
Alvin D. Tyrrel
John B. Aufuldish
BY Toulmin & Toulmin
His ATTORNEYS.

(No Model.) 6 Sheets—Sheet 5.
A. D. TYRREL & J. B. AUFULDISH.
CASH REGISTER AND INDICATOR.
No. 511,257. Patented Dec. 19, 1893.
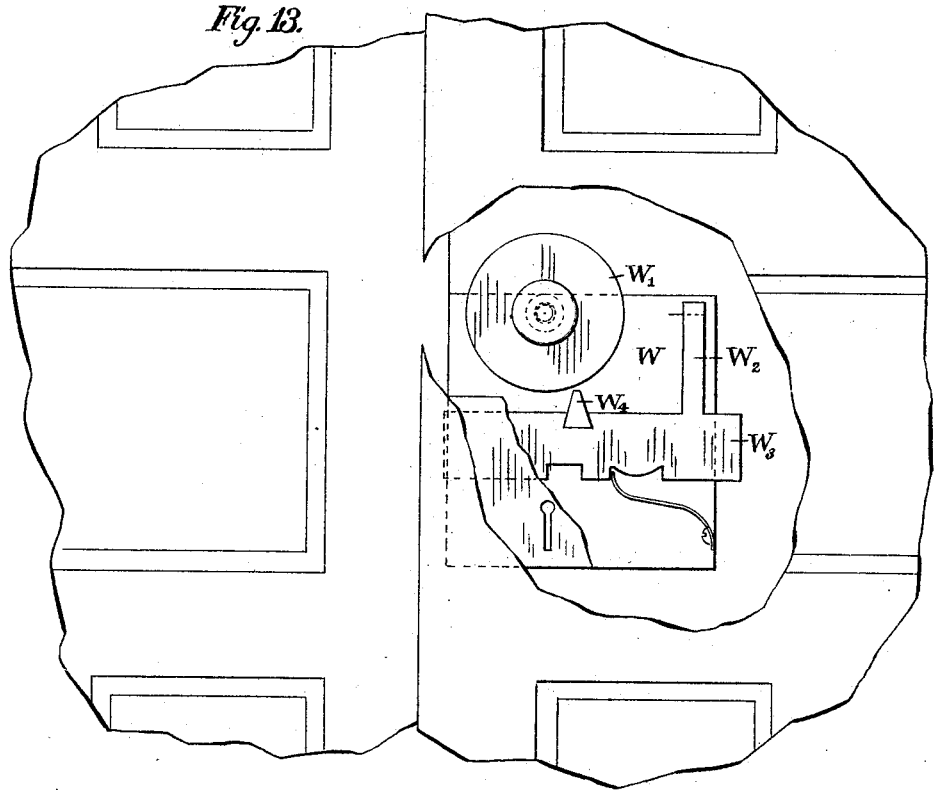
WITNESSES:
R. J. McCarty
Ewing French
INVENTORS:
Alvin D Tyrrel
John B. Aufuldish
BY Toulmin & Toulmin
ATTORNEYS.

(No Model.) 6 Sheets—Sheet 6.
A. D. TYRREL & J. B. AUFULDISH.
CASH REGISTER AND INDICATOR.
No. 511,257. Patented Dec. 19, 1893.
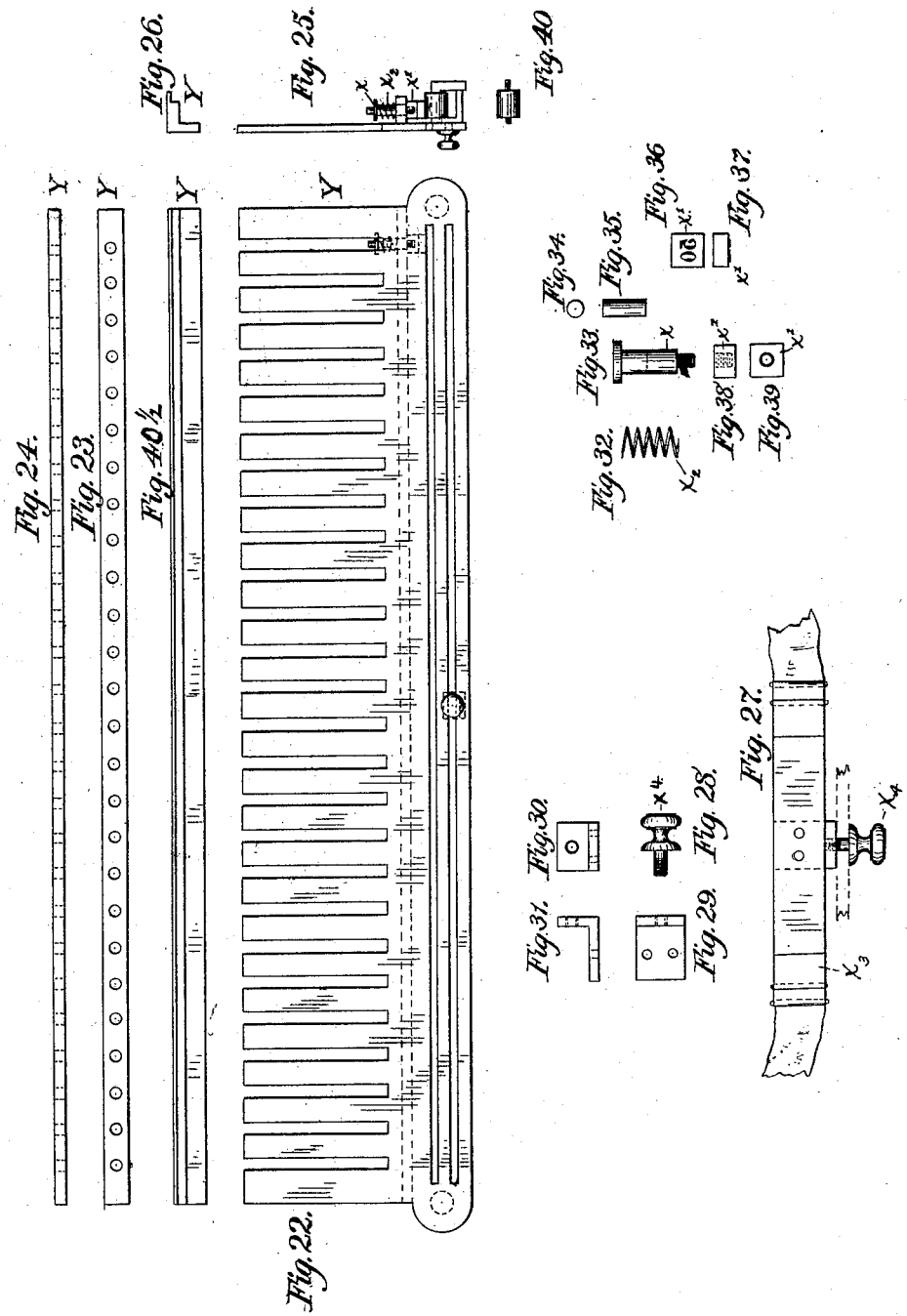
WITNESSES:
R. J. McCarty
Ewing French
INVENTORS:
Alvin D. Tyrel
John B. Aufuldish
BY Toulmin & Toulmin
ATTORNEYS.

UNITED STATES PATENT OFFICE.

ALVIN D. TYRREL AND JOHN B. AUFULDISH, OF DAYTON, ASSIGNORS TO THE COLUMBIA CASH REGISTER COMPANY, OF MIAMISBURG, OHIO.

CASH REGISTER AND INDICATOR.

SPECIFICATION forming part of Letters Patent No. 511,257, dated December 19, 1893.

Application filed August 8, 1892. Serial No. 442,491. (No model.)

*To all whom it may concern:*

Be it known that we, ALVIN D. TYRREL and JOHN B. AUFULDISH, citizens of the United States, residing at Dayton, in the county of Montgomery and State of Ohio, have invented certain new and useful Improvements in Cash Registers and Indicators, of which the following is a specification, reference being had therein to the accompanying drawings.

Our invention has reference to new and useful improvements in cash registers and indicators.

The object of our invention is to reduce the mechanism requisite to accomplish the manifold objects sought to be attained in cash registers, and to otherwise improve and perfect the working thereof.

To these ends our improvements relate to a series of key-levers graduated in a manner to govern the extent of movement of each key and to other points that are illustrated in the drawings and will be described in the specification.

Other features of cash register improvements designed to be used in connection with our present improvements, consisting of an indicator system, and a folding lid for a money receptacle are covered by the application of John B. Aufuldish now pending before the United States Patent Office for Letters-Patent on improvements in cash registers and indicators, Serial No. 427,408, filed April 1, 1892.

In the drawings herewith presented, Figure 1 is an elevation from the rear, showing a primary ratchet disk with a part broken away to show the ratchet teeth of the rear section, the stop pawl with its accompaniments, and the key arresting mechanism; Fig. 2, an elevation from the rear with part of the key arresting device broken away to show the locking bolt by which the locking plate is locked in a position to prevent the operation of the keys. Figs. 3 and 4 are detached detail views of the locking bolt; Fig. 5, a side elevation of the registering apparatus with one side removed to show the keys and other conjunctive features; Fig. 6, a detached view of the stop pawl mechanism; Fig. 6½, a detail edge view of the stop pawl mechanism; Fig. 7, a section on the line of $x$—$x$ of Fig. 6; Fig. 8, a detached detail view of the bell sounding device; Fig. 9, a detached detail view of the slotted plunger by means of which the keys are kept out of engagement with the vertical locking hook when the folding cover of the money receptacle opens; Fig. 10, a plan view from the top, showing the main shaft, one key and the oscillating shaft with other conjoint mechanism; Fig. 11, a detached side view of three keys, two of which appear in dotted lines, showing their different graduations; Fig. 12, an edge view of a key-lever; Fig. 13, a view of the door broken to show the device for detecting wrongful entry to the machine. Figs. 14 to 20 inclusively are detached detail views of the detecting device. Fig. 21 is a detached detail view of the pin $m$ with the casing A and plate J shown in section. Figs. 22 to 40½ inclusively are detached detail views of the printing attachment. Fig. 41 is a detached detail side elevation of the cam element of the key-locking device. Fig. 42 is a detached detail front elevation of the same.

The letters used to indicate the respective parts of our invention will be used to denote the same parts throughout the several views.

The letter A, indicates the casing or support for the various devices.

B, represents the main shaft attached by any suitable means to the sides of the casing; mounted on which is a series of lever-keys C, the finger pieces of which are numbered to correspond with the price of the purchase to be registered. The numbers of these keys may vary according to the requirements of each machine. I have shown two lever-keys of shapes varying from a straight lever to one having the greatest curve, as shown in Fig. 11. The graduations of the curves vary gradually, and the straight and curved levers show the two extremes. An upward tendency of these keys is maintained by the spring (*a*) attached to the general spring support (*b*). At a suitable distance from the sides of the casing A, the main shaft B, is journaled in one end of the arms (*c c*). To the other ends of these arms is rigidly attached an oscillating shaft D; this shaft is maintained in an upwardly inclined tendency by the spring ($a'$). When a depression of the key-lever C, is made it presses against the oscillating shaft D, and bears it downward to a position shown in broken lines in Fig. 5; it will also be seen in this figure that the straight key-lever in its travel will bring the shaft D, to the lowest point, as shown in dotted lines, and will register the greatest amount.

The letter ($e$) indicates a set screw on each of the curved key-levers. This is a means we provide to effect a more exact adjustment of the travel of the oscillating shaft D, by the set screw passing through the key-lever and pressing against said shaft. To this oscillating shaft D, is movably attached, in a vertical position, a pitman F. At the upper end of this pitman is attached an oscillating arm E, pivoted to and radiating from the center of a ratchet disk G; this disk is composed of two separate plates securely attached to each other and adapted to rotate as a single wheel; the circumferences of these plates are provided with ratchet teeth extending in contrary directions to each other.

In Fig. 1, we have broken away a portion of the front plate to show the manner in which the teeth in the rear plate extend. To the outward end of arm E, a pendent ratchet pawl E′ is pivoted, borne inwardly by the action of the spiral spring ($f$) and downwardly by the action of the pitman F. The normal position of this pawl E′ is that shown in Fig. 1—in engagement with a registering ratchet tooth of a disk. The depression of one of the keys, will as before stated, actuate the oscillating shaft D, in a downward direction to a degree corresponding to the graduation of the key-lever, and the shaft D, in turn has the effect of bringing with it in its downward movement, the pitman F, and therewith the pawl-bearing arm E, and thus the registration is made.

It will be understood that the ratchet teeth may represent any series of figures; in the present instance the movement of one tooth will register five cents, the elements of the registering mechanism being so arranged that when a key is depressed, the number shown on such key will appear through a sight opening in the front of the machine. The momentum imparted to the disk will naturally give it a tendency to rotate farther than is desirable and thereby cause overregistration; to remedy this, we have provided a pawl E″ pivoted to a bracket H, attached to the inside of the front frame, or it may be situated in any position that will be desirable; to the bracket is attached cam ($h$) to which pitman H′ is attached. This cam is adapted to slide up and down in a slot (I) Fig. 6½, by the action of the pitman H′. Pivoted to this sliding cam, is an adjunctive pawl I′ which is kept in an operative position by the spring ($i$) and lug ($i'$). It will be observed that the pin ($o'$) of pawl E″ is kept in contact with the lower end of the pawl I′ by a spring O. As before stated pawl E″ is designed to act as a check to the ratchet disk's movement, and rests against teeth extending in a contrary direction to those against which the actuating pawl E′ rests.

The operation of the check pawl is as follows: When the key-lever C is depressed, the pitman H′ is actuated downwardly simultaneously with the registering pitman F, both of which are attached to the oscillating shaft D. The sliding cam bearing the pendent pawl I′ is brought downwardly in the slot I, until the check pawl E″ makes the travel necessary to bring it against the ratchet teeth at the proper moment. We show in View 5, a straight key-lever. This gives the full length of stroke to the pitman actuating the sliding cam ($h$) and check pawl E″. The oscillating shaft D, shown in Fig. 1, will be actuated according to the graduations of the key-levers; a straight lever will give the shaft D, a greater distance of travel, and consequently the pitman H′ operating the checking pawl mechanism, a movement corresponding thereto. In this instance the checking pawl E″ will travel entirely around the adjunctive pawl I′ before engaging with a tooth of the ratchet disk. We are aware that by the use of a curved key-lever the pawl E″ cannot make the entire circuit of the pawl I′; this may be accomplished, however, and said pawl allowed to make the circuit by providing a separate or secondary oscillating shaft to be placed in proximity to the shaft D, and in a position to enable said secondary shaft to come in contact with the level surface of the key-lever when said lever is depressed.

Coming now to another feature of our invention, the letter J, indicates a locking-plate with vertical slots with notches therein. these slots are arranged to allow the rear ends of the key-levers to move vertically and come in or out of engagement—locked or unlocked thereby. A spiral spring ($a''$) imparts a normal tendency of the plate in one direction as shown in Fig. 1. In this position the rear points of the key-levers are resting against the lower surfaces of the slots in said locking-plate. We will now explain the means whereby this plate is shifted into a locking position. On one end a cam P, is attached so as to permit the inclined surface P′ thereof, to penetrate the vertical slot. Fig. 1, shows in broken lines, the incline P′ of the cam. Fig. 10 shows a key-board M. A pin ($m$) extends from one end of this key-board. The end of this pin has a bearing against the cam P, and as the pin is moved vertically by the action of the key-lever raising the key-board, the pin moves upwardly until it reaches the incline P′ of the cam; at this juncture the bearing of the pin against the cam surface is materially decreased, until the key-lever is made to travel its entire distance, when the pin ($m$) resumes its former position. A key that is stopped before a complete depression has been made, will become locked by reason of the pin ($m$) not being allowed to make the circuit around the inclined surface of the cam P, and consequently prevent the operation of any other key until a complete trip of the key first touched, is made.

To lock all the keys irrespective of the means just described, in which the key-levers themselves perform the functions of a locking and unlocking medium, we have applied to the locking-plate J, in a position opposite the cam P, a bolt ($r$) provided with a pin to move in an oblong slot of a vertically moving rod ($s$) terminating at its lower end in a horizontal extension, which contains said slot. This device may be put into operation by the application of any of the numerous locks. We do not require any special lock therefor. The bolt ($r$) as shown in Fig. 2, is subjected to a reciprocating movement, vertically, by the action of the rod ($s$) which is in operative connection with the locking mechanism. The bolt ($r$) moves in close proximity to the slot but has no contact therewith; the side of the pin ($m$) bears against the side of the bolt when said bolt is raised to an unlocked position, as shown in Fig. 2, and this contact maintains the plate J, disengaged from the surface of the slot in said plate, and permits the key-levers to work in said slots. To lock the plate out of operative position by this means, the bolt ($r$) is lowered from the position shown in Fig. 2, and thereby brought out of contact with the pin ($m$). The plate J, is then allowed to slide laterally and the pin ($m$) to occupy the space previously occupied by the bolt ($r$) and the key-levers cannot be then operated.

The cover of the money receptacle is composed of three panels $u$ as shown in Fig. 5, adapted to slide one over the other in ways provided therefor in the sides of the casing; the lower one of these panels at both ends is provided with a latch $z$ which detains the sliding panels in a closed position by engaging with the detent $z'$ pivoted to the side of the casing and to the horizontal lever $z^2$ which lever is pivoted at its rearward end to a vertical lever $z^3$; the fulcrum of lever $z^2$ is at $z^4$. The operation of releasing the latch $z$ to allow the sliding of the panels, is performed by the key-board M impinging with the vertical lever $z^3$ which in turn actuates lever $z^2$ to lower detent $z'$ at which time the spring $z^5$ causes said panels to slide one over the other.

It may be desirable at times to use the apparatus in a manner to prevent the panel ($u$) of the folding cover of the money receptacle from coming against the rod ($t$) to effect an engagement of the vertical locking hook ($n$), with the key-board M, as shown at ($n$) in Fig. 10. This is done by means of a slotted plunger T, which plunger is provided with bevel edge lugs ($i''$ and $i'''$) and is attached to the front of the casing.

Fig. 9, shows, detached from the casing, lugs ($i^4$ and $i^5$), which are in a position to operate to retain the plunger in or out of locking intercourse with the rod ($t$). This rod passes through an aperture in the lower end of the plunger, and it will be seen in Fig. 5, that by pressing the plunger downward the rod ($t$) will be carried out of the line of the panel ($u$) of the folding cover, while in this condition the vertical hook ($n'$) will not become engaged with the key-board.

The letter ($d$) indicates a bell attached to the rear end of the casing A. A hammer-bearing pawl ($d'$) is also pivoted to the casing in a convenient place for the hammer to be sprung against the bell, when the pawl ($d''$) pivoted to the upright rod K, is brought against it by the elevation of said rod which is actuated by the key-board M. The rod K, is maintained in a vertical position by guides ($e''$ and $e'''$) attached to the casing. A small set screw ($v$) is provided to adjust the rod K, relatively to the distance the key-board M travels. The spiral spring ($v'$) brings the rod to its downward normal position. When traveling in the downward direction, the pawl ($d''$) is kept from assuming a vertical position by a lug extension ($v''$) on the upper end of the rod K. A lug ($v^3$) attached to the casing prevents the hammer-bearing pawl ($d'$) from being drawn too far downwardly by the tension of spring ($a'''$). We also provide a detective system as a feature of our improved cash register, that will enable those having access to the machine at all times, to discover whether it has been opened or tampered with.

W indicates the rear plate of a lock, having revolubly attached thereto, a spool W', upon which may be wound, a strip of tape or paper or any material susceptible of receiving an impression from the point of a needle attached to the arm W², of locking bolt W³. There is also attached to the bolt W³, an elastic piece W⁴. The bolt is actuated horizontally in the usual manner by the insertion and turning of a key. When placed in a locking position, the piece W⁴, engages with the roller W', and turns it a sufficient distance to prepare a place for the punctuation of the needle in the arm W². This tape or ribbon may be examined every morning to ascertain whether the machine has been opened.

The remaining feature of our invention is illustrated in Figs. 22 to 40½ inclusively, and consists of a check printing attachment by which each key when depressed is brought against a type and a figure corresponding to the denomination of the key imprinted upon a check or piece of paper to be transferred to the cashier. These type are detachable as shown in the various views and consist of the stud X, threaded at the lower end. To this a nut X', bearing the number corresponding to that of the key it is to be operated by, is attachable. A cylindrical cavity is made in the upper portion of the stud for the reception of a rubber cushion against which the key-lever is borne when depressed. Around the stud, a spiral spring X², is encircled to facilitate the upward movement of the stud when the key releases it. The stud bearing the type is inserted in the opening of the front of plate Y, as shown in Fig. 22, and is secured therein by receiving the type-bearing nut, which tightens against the surface beneath the opening through which the threaded stem of the stud is placed. Under these types and extending across the front of the apparatus around a spool or spindle at the ends, is an inking ribbon $X^3$; this ribbon is subjected to an adjustable action by being secured to a sliding piece with a knob $X^4$, and the surface of the ribbon against which the type comes may be shifted at will. A smooth surface or platen is situated immediately beneath the ribbon upon which the card or paper to receive the impression of the type is placed. The ribbon is held taut by means of buckles attached to some suitable elastic tape.

Having fully described our invention, what we claim as new, and desire to secure by Letters Patent, is—

1. In a cash register and indicator provided with the herein described registering mechanism, and a series of adjustable and graduated keys with fixed values, for operating said mechanism, the combination of a pitman-actuated sliding cam, a plate attached in the rear thereof, a pendent pawl attached to said plate beneath the sliding cam, and operated by said cam to engage with the teeth of a rotating disk, and thereby prevent the momentum imparted by the registering pawl from carrying the disk too far and recording a wrong registration.

2. In a cash register and indicator, the combination with a casing, of a series of key-levers graduated to travel a distance corresponding to the value of each key, a reciprocating shaft with arms connecting it with the main shaft, a spring attached to said shaft giving it a normal tendency upward, adjustable set screws by which the key-levers may be adjusted in their contact with the reciprocating shaft so as to limit or increase the extent of movement imparted to said shaft by the key-levers, pitman and pawl connections between said shaft and a primary disk, said disk provided with a double set of ratchet teeth on the circumference thereof, one set to engage with a starting pawl, the other set to engage with a stopping pawl, substantially as herein described.

3. In a cash register and indicator, the combination with a casing, and a series of adjustable graduated key-levers having a fulcrum therein, and a rotatable disk with two sets of ratchet teeth on the periphery thereof, of a cam adapted to move vertically against a plate by means of a pitman, said cam bearing a pawl, a pawl also attached to said plate and provided with a pin adapted to bear against the lower end of the cam pawl and travel there-around by the action of said pitman, and become engaged with a ratchet tooth, substantially as described.

4. In a cash register and indicator, the combination with a casing, a series of key-levers, having their fulcrum on a main shaft, a keyboard extending longitudinally over and movably adjacent to said key-levers, the keyboard at one end terminating in a rearwardly extending pin, a locking plate with vertical slots therein, said pin adapted to work against the inclined surface of a cam lug and thereby operate to move said locking plate in locking position with the keys until a complete trip of the key last operated is made.

5. In a cash register and indicator, the combination with a series of key-levers with their fulcrum therein, and a circumferential ratchet tooth disk, and the herein described mechanism for rotating said disk, of a longitudinal key-board extending adjacent to said keys, and having a rearwardly projecting pin, a longitudinal key-locking-plate with vertical slots, a cam lug adapted to be placed over one of said slots, and a pin adapted to work against the inclined surface of said cam lug, and thereby lock or unlock the keys.

6. In a cash register and indicator the combination with a casing, of a series of key-levers with their fulcrum therein, a locking plate with vertical slots, mounted in the rear adjacent to said keys, a cam lug mounted on said locking plate, a pin extending from a key-board adapted to press against the sides of said lug, and thereby slide the plate to a locking position until the pin makes a circuit of said lug as herein described and for the purposes set forth.

7. In a cash register and indicator, the combination with a series of key-levers with their fulcrum on a main shaft in the casing, and a money receptacle, of a slotted plunger with inclined lugs on a side thereof, adapted to engage with similar lugs on the casing, an aperture at the lower end of said plunger to receive the rod ($t$) and carry it out of the way of engagement with the panel ($u$) of the folding lid, substantially as described.

8. In a cash register and indicator, the combination with the casing, and a series of key-levers, and a main shaft forming the fulcrum thereof, and a money receptacle, of a slotted plunger adapted to move vertically, with inclined lugs on the side thereof to bear against a similar number of lugs adjacent thereto on the casing, an aperture in the lower end of said plunger to receive the rod ($t$) and carry the same out of the way of contact with the folding cover of the money receptacle.

9. In a cash register and indicator, the combination with the main shaft, of a series of key levers provided with graduated curves and adjustable set screws, the curves in said key levers corresponding to the value of said key levers, from the lowest to the highest denomination, substantially as and for the purposes specified.

10. In a cash register and indicator, a series of key levers with graduated curves therein, said curves varying in the extent thereof to correspond with the value of each key, adjustable set screws to effect a more exact adjustment of said graduated levers, a horizontal reciprocating shaft pivoted to the main shaft and adapted to be depressed by contact with the curved portions of the key levers, as said key levers are pressed downwardly, substantially as and for the purposes specified.

11. In combination the key levers, the horizontal plate Y, with vertical spaces in which said key levers are placed, the platen, and the openings adjacent to said spaces, the stud with a cylindrical cavity, a rubber cushion seated in said cavity against which the key lever bears when depressed, the nut $x'$ bearing a number corresponding to that of the key lever attached to the stud $x$, the inking ribbon $x^3$, with the sliding piece and knob $x^4$, substantially as described.

12. The key levers C, the horizontal plate Y, provided with the platen, and vertical spaces, and the inking ribbon as herein described, a series of type-bearing studs adapted to fit in openings in the plate Y, and adapted to be depressed by the downward movement of the key levers, the registering wheel connected to the oscillating shaft D, the pitman F, the arm E and the pawl E', the latter adapted to engage the teeth of the registering wheel by the depression of a key lever, substantially as shown and described.

In testimony whereof we affix our signatures in presence of two witnesses.

ALVIN D. TYRREL.
JOHN B. AUFULDISH.

Witnesses:
R. JAY McCARTY,
HARVEY CONOVER.